(12) United States Patent
Oulai et al.

(10) Patent No.: US 7,957,350 B2
(45) Date of Patent: Jun. 7, 2011

(54) ACCESS NETWORK SELECTION

(75) Inventors: Desire Oulai, Longueuil (CA); Yves Lemieux, Kirkland (CA)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 144 days.

(21) Appl. No.: 12/175,623

(22) Filed: Jul. 18, 2008

(65) Prior Publication Data
US 2010/0014455 A1    Jan. 21, 2010

(51) Int. Cl.
*H04W 4/00* (2009.01)
(52) U.S. Cl. ........................................ 370/332
(58) Field of Classification Search .................. None
See application file for complete search history.

(56) References Cited

U.S. PATENT DOCUMENTS

| | | | |
|---|---|---|---|
| 7,043,225 B1 | 5/2006 | Patel et al. | |
| 7,245,915 B2 | 7/2007 | Matta et al. | |
| 2003/0069018 A1* | 4/2003 | Matta et al. | 455/436 |
| 2003/0074443 A1 | 4/2003 | Melaku et al. | |
| 2007/0147320 A1* | 6/2007 | Sattari et al. | 370/338 |
| 2008/0165711 A1 | 7/2008 | Wyld | |

FOREIGN PATENT DOCUMENTS

| | | |
|---|---|---|
| EP | 1229751 A1 | 8/2002 |
| WO | 2007/019871 A1 | 2/2007 |
| WO | 2007/027129 A1 | 3/2007 |

OTHER PUBLICATIONS

PCT Search Report from corresponding application PCT/IB2009/052940.

* cited by examiner

*Primary Examiner* — Jianye Wu
(74) *Attorney, Agent, or Firm* — Dilip C. Andrade; Ericsson Canada Inc.

(57) ABSTRACT

A network, computer readable medium, and method for ranking a plurality of available access networks by a provider, the provider serving a user equipment and the user equipment being configured to connect to at least one of the plurality of available access networks. The method includes receiving a selection request at a selection entity of the provider, where the selection request includes a vector parameter P that includes required characteristics of a data flow for the user equipment, sending from the selection entity a capability request, including the vector parameter P, to the plurality of available access networks, receiving at the selection entity a capability response from the plurality of available access networks, wherein each capability response includes a normalized value expressing a capability of a corresponding available access network to provide the required characteristics of the data flow, and generating a ranking list of the available access networks based on the received normalized values.

22 Claims, 10 Drawing Sheets

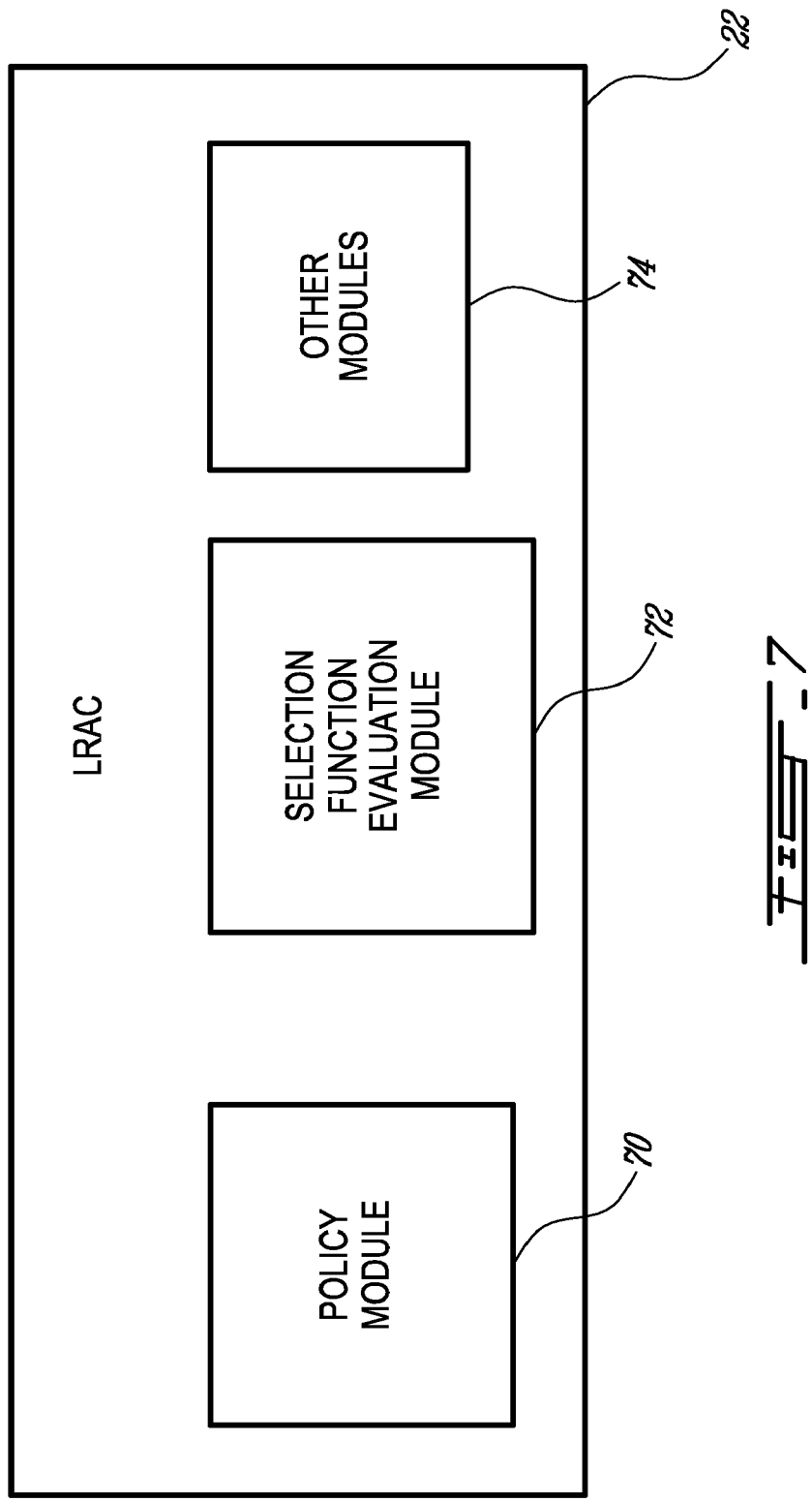

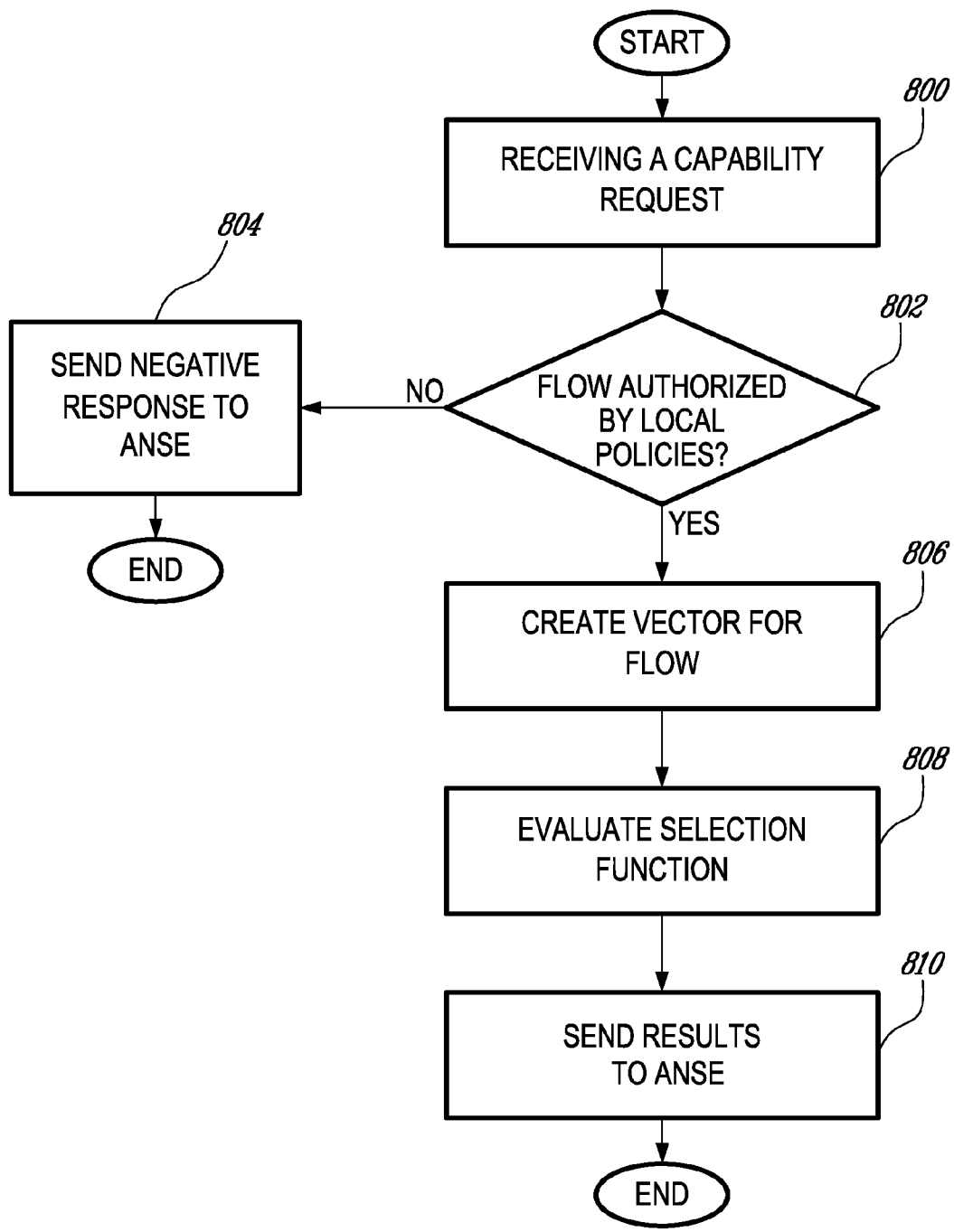

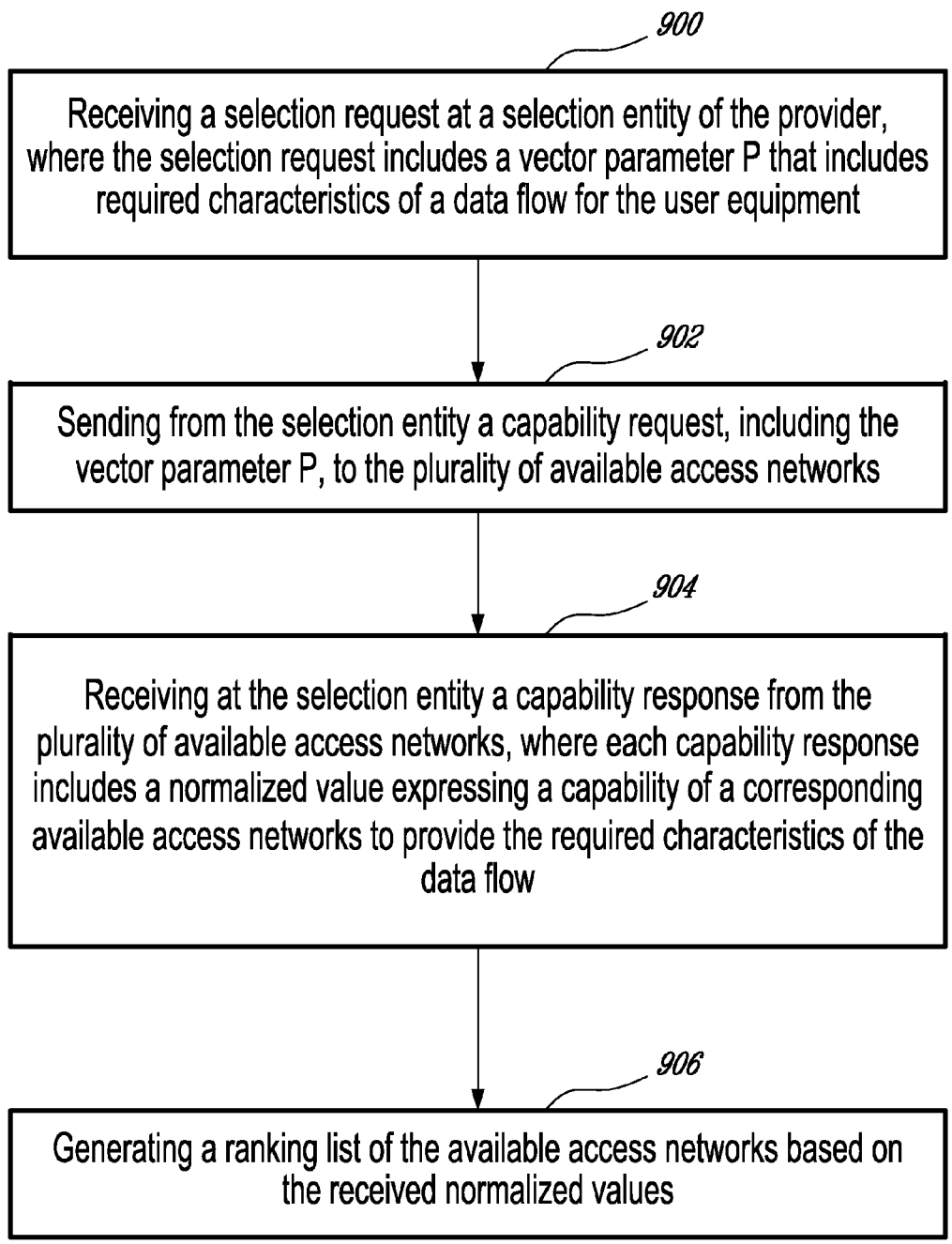

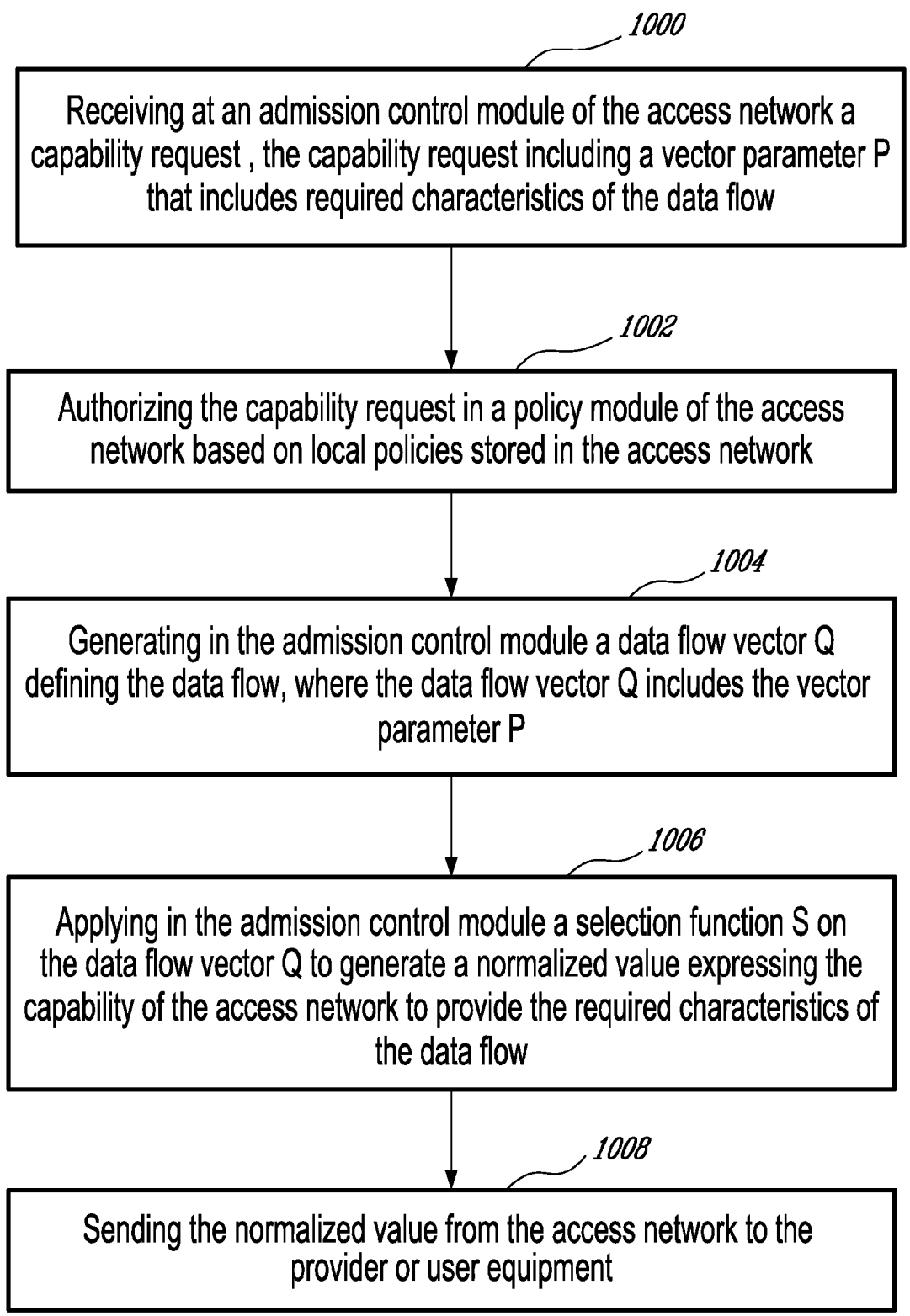

ACCESS NETWORK SELECTION

TECHNICAL FIELD

The present invention generally relates to communication systems, devices, software and methods and, more particularly, to mechanisms and techniques for selecting an access network from a plurality of available access networks.

BACKGROUND

During the past years, the interest in access technologies for providing services for voice, video and data has increased. A user has the option to connect his or her user equipment to one of a plurality of access networks, all available at a certain physical location. In this regard, it is noted that the user might use an Internet Service Provider (ISP) and one or more of the available access networks are independent of the ISP. Also, the communication of the user equipment may be entirely IP based, e.g., VoIP. The task of selecting the appropriate access network (i.e., an access network that is able to meet required characteristics) becomes more complex as the user equipment has to take into account various parameters, for example, a speed of the network, jitter, packet loss, and other factors. Thus, the communication networks are evolving toward multi-access architecture and terminals will likely soon find themselves in environments where they may be able to access any one of a number of different access networks.

Efficient access network selection is an important task for guarantying different characteristics such as Quality of Service (QoS) or reduced costs to the users as well as managing efficiently the network resources. However, it is likely that the ISP is not the owner of all the available access networks. Therefore, there is the challenge of obtaining sustained QoS and cost information in order to correctly steer the selection.

FIG. 1 shows a multi-access network architecture 10. In this network architecture, the ISP 12 serves a user equipment (UE) 14. The user equipment 14 may be a wireless device or a wired device that includes multiple interfaces through which the user equipment may connect to the access network. One of ordinary skill in the art would appreciate that a wireless device may include any device that is configured to communicate wireless with a node, for example, a personal digital assistant, a mobile phone, a laptop, etc. The user equipment 14 has the choice, in this instance, to connect to one of the available access networks AN1 16, AN2 18, and AN3 20. Each access network AN1 to AN3 may use different Radio Access Technologies (RAT) like Long Term Evolution (LTE), Wireless Local Area Network (WLAN), Worldwide Interoperability for Microwave Access (WIMAX) or other technologies to connect to the user equipment 14. The user equipment 14 may have the choice to connect to any of AN1 to AN3 while being at a given physical position, as long as the user equipment is configured to support the access network technology.

In this context, the decision to which one of the existing access networks the user equipment is to be connected may be based on a certain parameter or a plurality of parameters. The decision may be made by the ISP 12, the user equipment 14 or some combination thereof. However, for this kind of solution, the access networks AN1, AN2, and AN3 have to send information related to their states (characteristics and capabilities of the network) to a selection entity (which may be located in the ISP 12, the user equipment 14, or outside of the ISP and user equipment) to make the decision. Based on the information received from the access networks, the selection entity in the ISP or user equipment may classify the available access networks and provide the user equipment with a ranking list of the available access networks.

However, this solution requires the access networks to share and/or disclose information about their specific capabilities with the core network operator (ISP) or other external entity. In a competitive market, operators of the access networks may be reluctant to share such information and thus, open access to these access networks is limited.

Other approaches suggest sending data flow characteristics desired by the user equipment to the access networks such that the access networks will evaluate if they are capable of handling the data flow. In this case, no undesired information is shared by the access network with the ISP or user equipment. However, these approaches only provide a binary response to the ISP or user equipment regarding their capabilities, i.e., "yes" or "no" type of answers. Thus, if several access networks respond positively to a request from the ISP, it is still difficult to distinguish them in the ISP and the selected access network may be suboptimal in terms of resources or QoS for a particular connection.

Accordingly, it would be desirable to provide devices, systems and methods for selecting an appropriate access network that avoids the afore-described problems and drawbacks.

SUMMARY

According to one exemplary embodiment, there is a method for ranking a plurality of available access networks by a provider, the provider serving a user equipment and the user equipment being configured to connect to at least one of the plurality of available access networks. The method includes receiving a selection request at a selection entity of the provider, where the selection request includes a vector parameter P that includes required characteristics of a data flow for the user equipment; sending from the selection entity a capability request, including the vector parameter P, to the plurality of available access networks; receiving at the selection entity a capability response from the plurality of available access networks, wherein each capability response includes a normalized value expressing a capability of a corresponding available access networks to provide the required characteristics of the data flow; and generating a ranking list of the available access networks based on the received normalized values.

According to another exemplary embodiment, there is a selection entity of a provider for ranking a plurality of available access networks, the provider serving a user equipment and the user equipment being configured to connect to the plurality of available access networks. The selection entity includes a network discovery module for detecting the plurality of available access networks, and a network selection module connected to the network discovery module. The network selection module receives a selection request for ranking the plurality of available access networks in a list, where the selection request includes a vector parameter P that includes required characteristics of a data flow for the user equipment, sends from the selection entity a capability request, including the vector parameter, to the plurality of available access networks, receives a capability response from the plurality of available access networks, where each capability response includes a normalized value expressing a capability of a corresponding available access networks to provide the required characteristics of the data flow, and generates a ranking list of the available access networks based on the received normalized values.

According to still another exemplary embodiment, there is method for determining a capability of an access network to meet required characteristics of a data flow for a user equipment, where the user equipment or a provider selects one of a plurality of available access networks based on a ranking of the plurality of available access networks. The method includes receiving at an admission control module of the access network a capability request, the capability request including a vector parameter P that includes the required characteristics of the data flow; authorizing the capability request in a policy module of the access network based on local policies stored in the access network; generating in the admission control module a data flow vector Q defining the data flow, wherein the data flow vector Q includes the vector parameter P; applying in the admission control module a selection function S on the data flow vector Q to generate a normalized value expressing the capability of the access network to provide the required characteristics of the data flow; and sending the normalized value from the access network to the user equipment or the provider.

According to another exemplary embodiment, there is an access network for determining a capability to meet required characteristics of a data flow for a user equipment, where the user equipment or a provider selects one of a plurality of available access networks based on a ranking of the plurality of available access networks. The access network includes an admission control module for receiving a capability request, the capability request including a vector parameter P that includes the required characteristics of the data flow; a policy module connected to the admission control module, the admission control module authorizing the capability request based on local policies stored in the access network; the admission control generating a data flow vector Q defining the data flow, where the data flow vector Q includes the vector parameter P, and applying a selection function S on the data flow vector Q to generate a normalized value expressing the capability of the access network to provide the required characteristics of the data flow; and a communication module for sending the normalized value from the access network to the provider or the user equipment.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 7 is a schematic diagram of a Local Resources and Admission Control (LRAC) management of an access network according to an exemplary embodiment of the present invention;

FIG. 8 is a flow chart illustrating steps performed by the LRAC of FIG. 7 according to an exemplary embodiment of the present invention;

FIG. 9 is a flow chart illustrating steps performed by a ANSE of a provider according to an exemplary embodiment of the present invention;

FIG. 10 is a flow chart illustrating steps performed by an LRAC of an access network according to an exemplary embodiment of the present invention.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of the ISP and access networks. However, the embodiments to be discussed next are not limited to these systems but may be applied to other existing communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
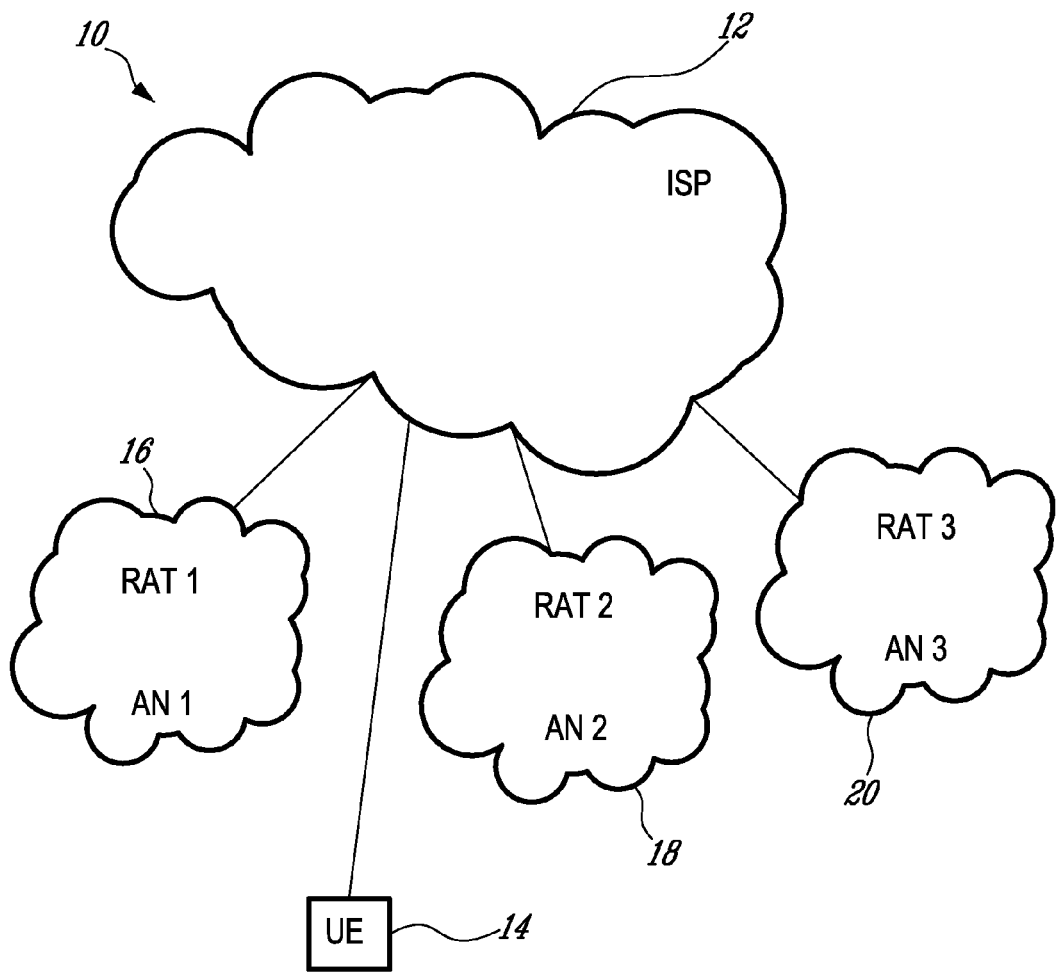
FIG. 1 is a schematic diagram of a communication network that includes a user equipment, a service provider, and a plurality of access networks.
Figure 2:
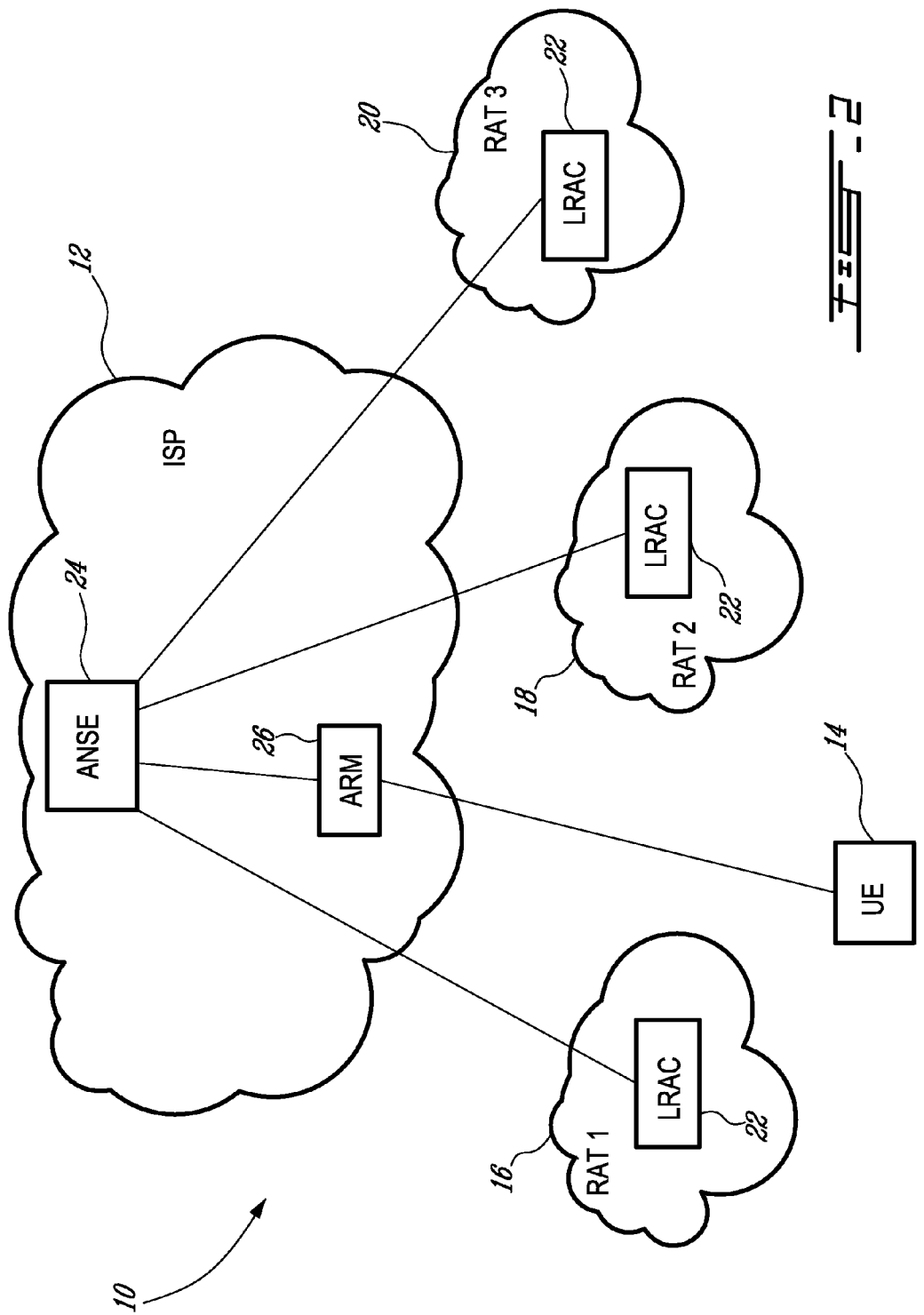
FIG. 2 is a schematic diagram of a communication network according to an exemplary embodiment of the present invention.

As shown in FIG. 2, according to an exemplary embodiment, a general communication system 10 includes the elements already shown in FIG. 1. However, in addition to those elements, FIG. 2 shows that each access network 16, 18, and 20 may be equipped with an entity for local resources and admission control management (LRAC) 22. The ISP 12 may be equipped with an access network selection entity (ANSE) 24. The ANSE may be a logical entity, which may be collocated with the ISP Access and Resource Manager (ARM) 26 or may reside in a separate physical node.

According to the following embodiments, the access networks characteristics are hidden, i.e., not disclosed to the ISP or the user equipment, in the access network selection process while still allowing for an accurate selection. As will be explained in more detail later, this solution is achieved by computing a selection function in the LRAC module of each access network and sending the results to the ARM 26 of the ISP 12. The function may be normalized and retrieved as an indicator, for example, as a percentage. In this way, the sensitive information of the access networks is not sent out to outside entities. In addition, the results for selecting a network are accurate as the sensitive information of the access networks is used to calculate those results.

More specifically, according to an exemplary embodiment, a parameter vector $P_f$ may be used for defining the QoS level requested by the user equipment 14 for a data flow f. The data flow may include any type of packet data connection or session, as requested by the user equipment. The parameter vector may be defined as:

$P_f$=[delay, jitter, packet loss, other factors].

More or fewer factors than the ones shown in the exemplary parameter vector $P_f$ above may be used. The parameter vector may be defined by the ISP or the user equipment, depending on the communication method used by the user equipment. For this exemplary embodiment, a vector $Q_{fn}$ may define the data flow f in the access network n. Thus, Q may have the form:

$Q_{fn}$=[$P_f$, cost per unit, other factors].

The cost per unit may refer to the cost that a client will incur for the connection and may be, for example, expressed as dollars per Mbps.

Q may be formed, within LRAC 22, based on the data flow characteristics P sent by ANSE 24 to the LRAC entity 22, plus some parameters, like cost per unit provided by the access network. However, the cost per unit and other factors are optional in one exemplary embodiment.

To further aid in obscuring network capabilities which are used to determine the value of $Q_{fn}$, exemplary embodiments may also normalize this value using a selection function S prior to transmitting the Q value to the ISP. S may, for example, be a common function known by the ANSE 24 and each of the LRAC entities 22. The ISP ARM 26 or the ANSE 24 may distribute the S function to all the LRACs 22. The function S may have different configurations, depending on the type of application. Function S may act on one or a plurality of parameters and may be defined to have an output that is expressed as a single number, for example, a percentage. In other words, function S is normalized such that for a plurality of parameters which are provided as input for the function, a single numerical value is outputted. In this way, the capabilities of the different access networks may be ranked in a list based on their corresponding normalized numerical value output by the function S.

One example of such selection function S is discussed next. This embodiment is exemplary and not intended to limit the invention. Other choices for the selection function S are possible. The selection function S(Q(P)), which may provide a percentage indicator based on the input vector Q, may calculate the percentage indicator based on delay, packet loss, bandwidth, access type (fixed or mobile), or other options. For instance, suppose that a user uses his Personal Digital Assistant (PDA) that has both WiFi and LTE accesses available. Suppose that the user is about to start a video conference session including High Quality voice delivery. The parameter vector P may, therefore, contain the following values: delay=45 msec, packet loss=0.001, bandwidth=380 Kbps, access type=fixed wireless. The computed selection function S(Q(P)) may produce the percentage indicator 65% because the required delay, packet loss, bandwidth, without other options are ranked as medium high.

For example, suppose that there are "m" QoS parameters in the Q vector and each parameter "i" is associated with a corresponding weight "$w_i$," such that $$\sum_{i=1}^{m} w_i = 1.$$

Further, if "$L_i$" and "$U_i$" are the lower and upper bounds, respectively, for the "i" parameter, and "Ri" is the real value of the QoS parameter "i," then the selection function may be, for example, $$S(Q) = \frac{\sum_{i=1}^{m} w_i f_i}{m}$$

with $$f_i = \begin{cases} 0 & \text{if } R_i \le L_i \\ \frac{R_i - L_i}{U_i - L_i} & \text{if } L_i \le R_i \le U_i \\ 1 & \text{if } R_i \ge U_i \end{cases}$$

As discussed above, this is an exemplary function and the invention is not limited to this function.

In one exemplary embodiment, the function S uses information provided exclusively from the LRAC and the LRAC performs all of the calculations for obtaining the single numerical value. Also, in one exemplary embodiment, the information provided by LRAC in the calculation of the numerical value may not be extracted from the single numerical value.

Figure 3:
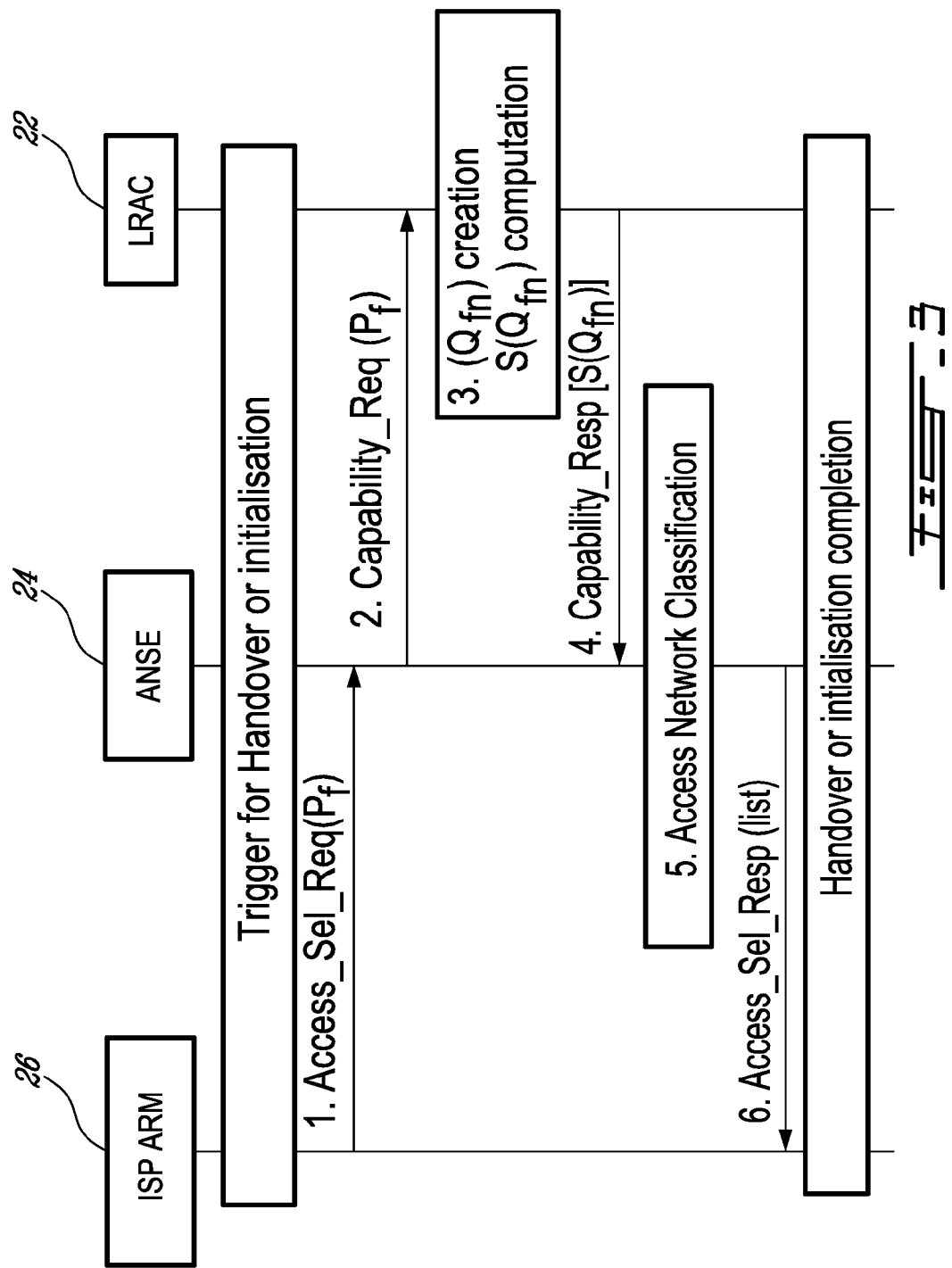
FIG. 3 is a flow chart illustrating an interaction among various parts of the communication network of FIG. 2, according to an exemplary embodiment of the present invention.

In the following exemplary embodiment, a method for ranking in a list the available access networks based on desired input parameters is discussed with reference to FIG. 3. It is assumed that, for example, a handover had been triggered or a new application has been launched (e.g., power on of a terminal) such that access network selection is needed. Other events also may trigger the search for access networks and the classification of these access networks. The handover and new application processes may depend on the application and mobility protocol in place (e.g., Mobile Internet Protocol v6 (MIPv6)).

In step 1, the ANSE 24 receives a selection request from the mobility or resource manager ARM 26. In step 2, the ANSE sends a capability request with the $P_f$ vector parameter to the LRAC 22 of each potential access network 16, 18, and 20. The LRAC 22 generates in step 3 the $Q_{fn}$ and computes $S(Q_{fn})$ based on the function S provided by the ARM 26 and other parameters available in LRAC 22. After the computation of S, the LRAC 22 returns in step 4 the $S(Q_{fn})$ normalized value to the ANSE 24. By providing the calculation of the S function at each LRAC 22, the confidential characteristics (needed in the calculation of S(Q)) of the corresponding access network are protected and not disclosed to the ISP 12 or other external parties as the result of the S function may be a pure number.

In step 5, the ANSE 24 classifies (ranks) the available access networks based on (i) the received $S(Q_{fn})$ and optionally, (ii) some others criteria like a business relationship between the ISP and the access network. For example, the ANSE 24 may first select all of the access networks with a $S(Q_{fn})$ value which is superior to 0.6. Then, the chosen networks are arranged in a list based on the received $S(Q_{fn})$ and other criteria. The ANSE 24 sends in step 6 the ranked list to the mobility or resource manager 26. At this point, the handover or initialization phase may be completed. In another exemplary embodiment, the ARM 26 is able to quantify the requested QoS for any data flow, whether it is a Push or Pull QoS model. In a Push model, QoS is requested by an Application Function in the network. In a Pull model, the user equipment requests the QoS. Thus, despite the QoS model, the ARM is able to quantify the QoS parameter. For example, if the user equipment requests a "silver" class quality level for a particular type of application, the ARM is able to quantify that in terms of delay, packet loss, jitter, etc.

Figure 5:
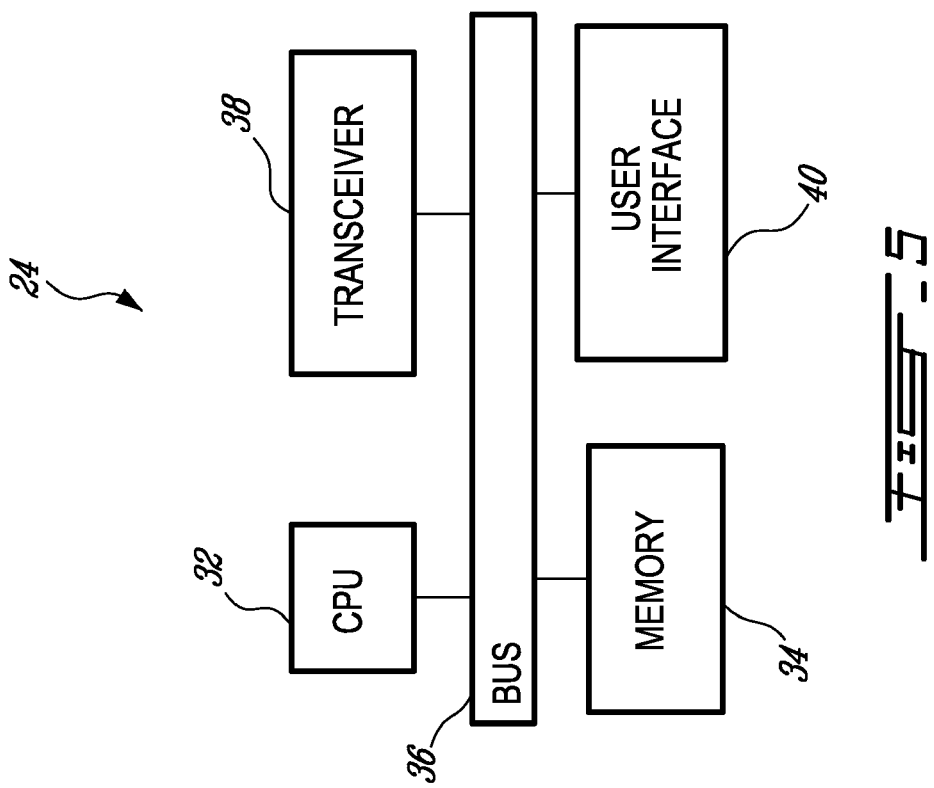
FIG. 5 is a schematic diagram of a structure that may be used to implement various units of the communication network of FIG. 2, according to an exemplary embodiment of the present invention.
Figure 4:
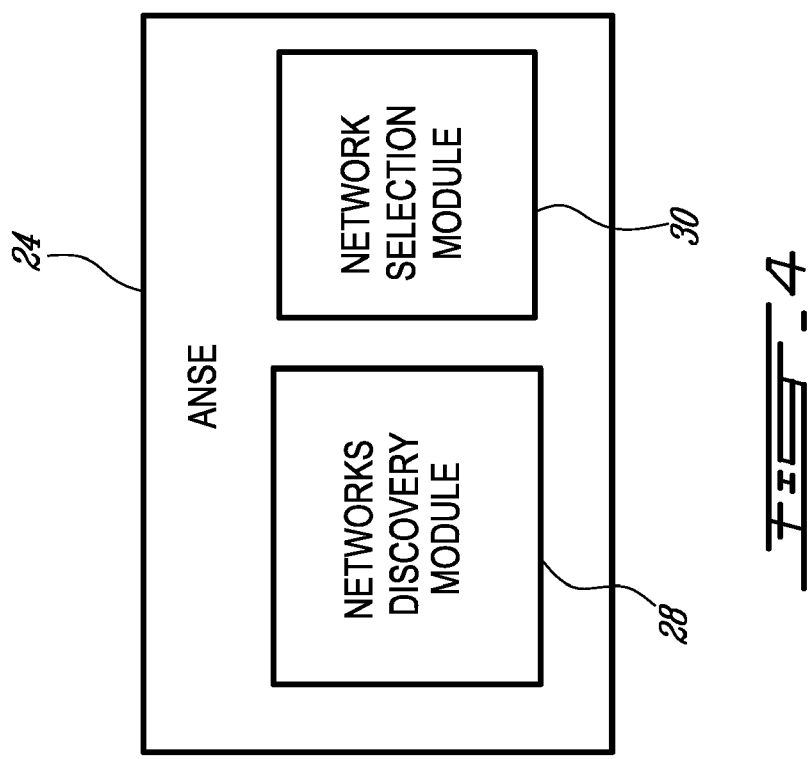
FIG. 4 is a schematic diagram of an Access Network Selection Entity (ANSE) according to an exemplary embodiment of the present invention.

The ANSE 24 may be equipped with modules capable of detecting the access networks, sending requests to the LRAC 22 containing the QoS requested for the data flows, receiving the responses under the form of a result of a normalized selection function, classifying the access networks, and sending the ranked list to the ARM 26. FIGS. 4 and 5 describe such a possible configuration for the ANSE 24.

Figure 6:
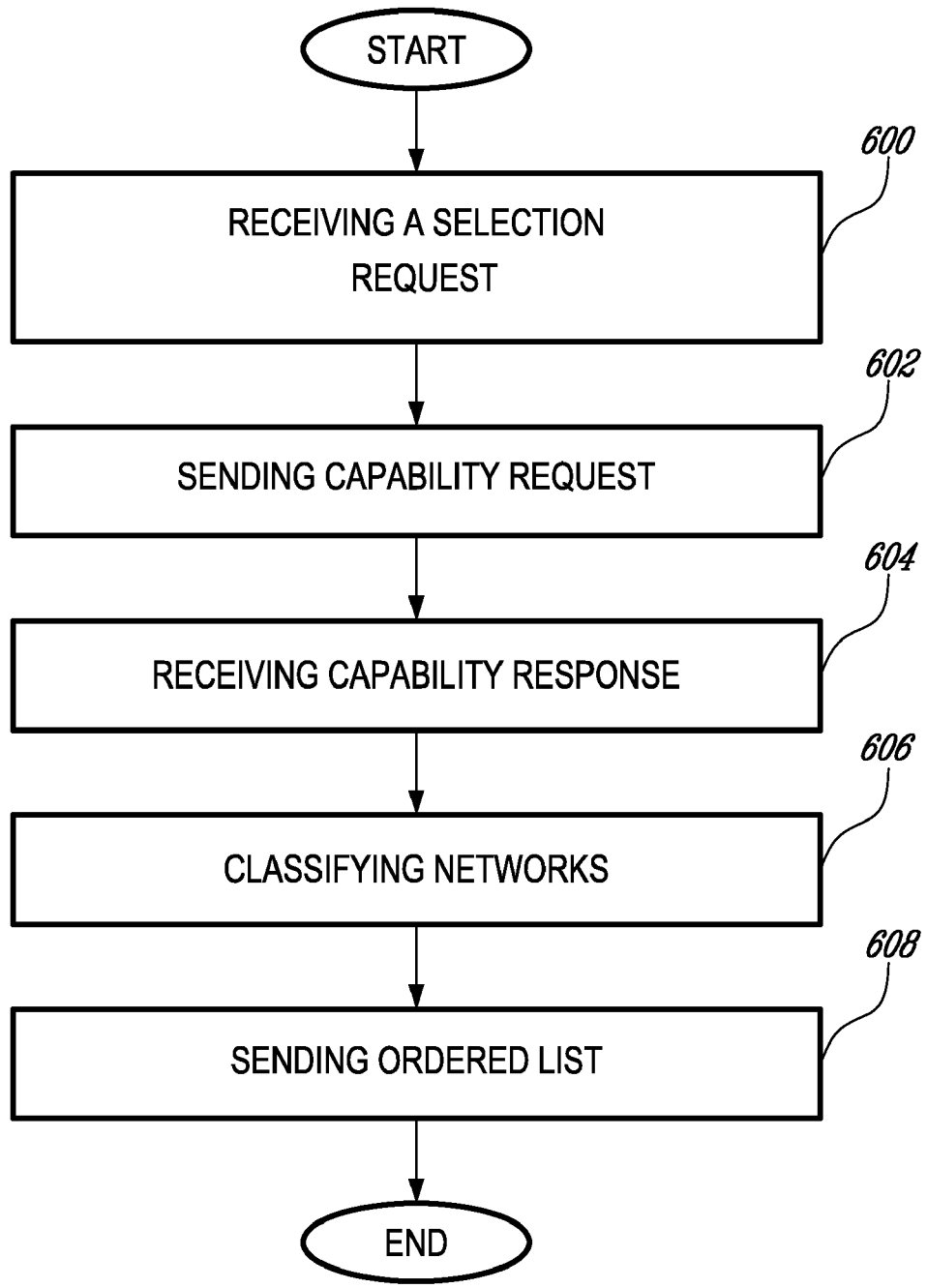
FIG. 6 is a flow chart illustrating steps performed by the ANSE of FIG. 4 according to an exemplary embodiment of the present invention.

More specifically, FIG. 4 shows that the ANSE 24 may include at least a network discovery module 28 and a network selection module 30. The network discovery module 28 may be configured to search for the available access networks and the network selection module 30 may be configured to perform operations as shown in FIG. 6. Each or both of the modules 28 and 30 may include one or more of the elements shown in FIG. 5.

FIG. 5 shows a possible structure of the ANSE 24. The structure may include a processor 32 connected to a memory 34 via a bus 36. The processor 32 may be configured to perform all the processing associated with a certain connection while the memory 34 may be configured to store states of the connection or other objects required by the processor 32. The structure may include a transceiver 38 and a user interface 40 connected to the bus 36. The transceiver 38 may be configured to communicate with parts of the ISP 12, the user equipment 14, or any of the access networks 16, 18, and 20. The user interface 40 may be configured to allow a user to interact with the structure, for example, by inputting commands.

FIG. 6 shows various steps executed at the ANSE 24 for providing the ranked list of access networks to the ARM 26 or the user equipment 14. In step 600, the ANSE receives, for example, from the ARM 26, a selection request with some data flow characteristics. In step 602, the ANSE 24 sends a capability request to the potentially available access networks, the request including one or more of the data flow characteristics. In step 604, the ANSE 24 receives from the available access networks a capability response indicating the capability of the access networks relative to the data flow characteristics. The capability response is expressed, in one exemplary embodiment, in percentage terms and may be produced by the selection function S discussed above. Other formats for reporting the capability response may be used. In step 606, the ANSE 24 classifies the access networks based on the received capability responses and in step 608, the ANSE 24 provides the ARM 26 or the user equipment 14 with the ranked list of the access networks.

FIG. 7 shows a structure of the LARC 22 of an access network according to an exemplary embodiment. The LRAC 22 may include various modules configured to receive the capability requests, to check the request against the local policies, to create a vector describing the data flow, to compute the selection function with internal parameters and send a response expressed as a percentage value with regard to the capacity of the access network. For example, FIG. 7 shows a policy module 70 configured to check, when receiving a request from an ANSE, whether the ANSE is authorized to receive information from the access network having the LARC 22. FIG. 7 also shows a module 72 for creating the parameter vector Q and computing the selection function S. The other modules 74 may include one or more modules for receiving the capability requests, sending the response, etc. There may be also other modules present in the LRAC as it is supposed to perform other specific tasks as recognized by one skilled in the art. One or all of the modules shown in FIG. 7 may be implemented using one or more of the elements described in FIG. 5.

FIG. 8 illustrates an exemplary embodiment in which the LRAC 22 interacts with the ANSE 24. In step 800, the LRAC receives a capability request from the ANSE 24 with some data flow characteristics. In step 802, the LRAC verifies the local policies and decides whether the request of data flow from the ANSE is authorized to interact with the LRAC. If the request is determined to not be authorized to interact with the LRAC, in step 804 a negative response is sent to the ANSE. The negative response may simply include a zero percentage. If the request from the ANSE is authorized to interact with the LRAC, in step 806 the LRAC calculates a vector Q describing the data flow in the current access network. In step 808 the LRAC evaluates the selection function S based on the generated vector Q, and in step 810 the results of the previous steps are sent from the LRAC to the ANSE, for example as a percentage.

According to an exemplary embodiment, a method for ranking a plurality of available access networks by a provider is illustrated in FIG. 9. Given the fact that the provider serves a user equipment and the user equipment is configured to connect to at least one of the plurality of available access networks, the method includes a step 900 of receiving a selection request at a selection entity of the provider, where the selection request includes a vector parameter P that includes required characteristics of a data flow for the user equipment, a step 902 of sending from the selection entity a capability request, including the vector parameter P, to the plurality of available access networks, a step 904 of receiving at the selection entity a capability response from the plurality of available access networks, where each capability response includes a normalized value expressing a capability of a corresponding available access networks to provide the required characteristics of the data flow, and a step 906 of generating a ranking list of the available access networks based on the received normalized values.

According to another exemplary embodiment, a method for determining a capability of an access network to meet required characteristics of a data flow for a user equipment is illustrated in FIG. 10. Given the fact that the user equipment or a provider selects one of a plurality of available access networks based on a ranking of the plurality of available access networks, the method includes a step 1000 of receiving at an admission control module of the access network a capability request, the capability request including a vector parameter P that includes required characteristics of the data flow, a step 1002 of authorizing the capability request in a policy module of the access network based on local policies stored in the access network, a step 1004 of generating in the admission control module a data flow vector Q defining the data flow, wherein the data flow vector Q includes the vector parameter P, a step 1006 of applying in the admission control module a selection function S on the data flow vector Q to generate a normalized value expressing the capability of the access network to provide the required characteristics of the data flow, and a step 1008 of sending the normalized value from the access network to the provider or the user equipment.

According to an exemplary embodiment, the user equipment may receive a (default) static ranked list of access networks at initialization or right after a handover. In this case, if the user equipment does not have the time to receive an up to date list of access networks from the ISP (i.e., to perform one of the processes described in FIGS. 6 to 10), the user equipment connects to the access networks stored in the static list.

However, if the user equipment has enough time before a handover or a new application is launched, the user equipment may go through the process described in FIGS. 6 to 10. In another exemplary embodiment, an ARM-Proxy or ARM-instance may be present in each RAT. This configuration may help when distribution is kept per network domain (i.e., RAT, ISP etc.). This situation may occur when the ARM of the ISP is not directly accessible in the Internet Service Provider domain but is instead accessible through an ARM-instance or ARM-proxy in the Radio Access Technology part. This may be required for the purpose of improving signaling performance by providing a more local rendering of the ARM. According to still another exemplary embodiment, the entire data flow of information between the user equipment and access network is IP based.

Figure 11:
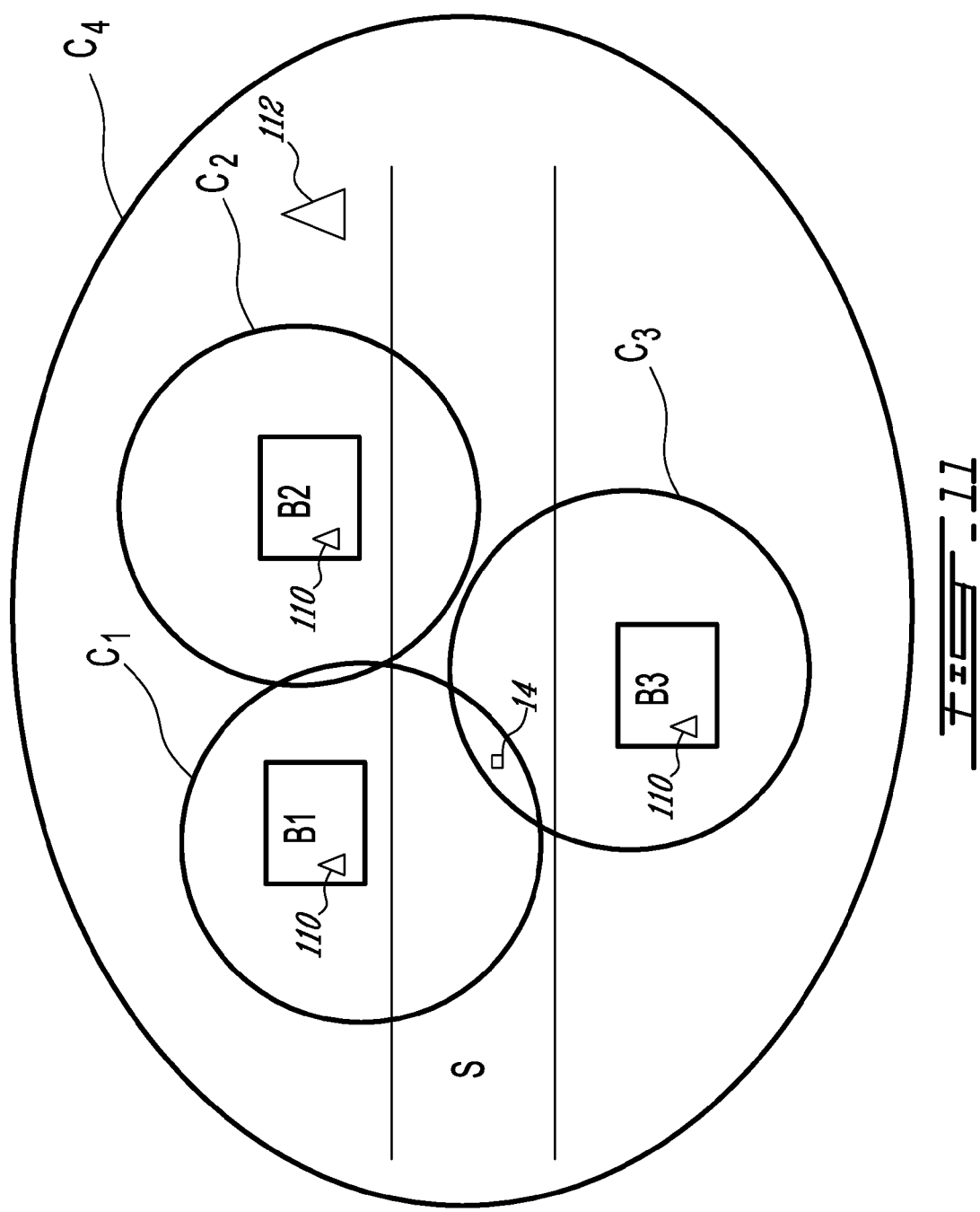
FIG. 11 is a schematic diagram of a communication network that may implement one or more features of the previous embodiments.

One example in which the selection of access networks described above may be applied is discussed with regard to FIG. 11. This example is not intended to limit the applicability of the invention. Other examples, different from the one shown in FIG. 11 are possible. FIG. 11 shows a street S in a town in which various businesses (or private residences) B1 to B3 are located. Each of these businesses B1 to B3 may have a private access network that includes a node 110, e.g., a wireless modem, that provides access to internet. Each node 110 covers a given area (cell) C1 to C3. At the same time, the area is covered by a dedicated wireless network (for example a national carrier), in this example illustrated as cell C4, which is served by node 112. A user that strolls down the street S with a wireless device 14, has at a certain location shown in FIG. 11, the possibility to connect to his or her provider via one of cells C1, C3 or C4. Thus, the cells C1, C3 and C4 act as available access networks. It is noted that the user may use IP packets to communicate with the provider, and the IP packets may include VoIP, data, audio or video segments. The methods discussed above for selecting an access network from a plurality of available access networks apply in this example. Also, a factor triggering the selection of an access network may be the presence of a new access network.

The methods and apparatuses discussed above have one advantage of hiding the access networks characteristic to other operators while providing an efficient and accurate way of network selection. The accuracy of the discussed methods may depend on the definition of the selection function. As with other solution, there is a "trust" relationship between the ISP ARM and the access networks LRAC, which have to compute $S(Q_{fn})$ and retrieve the correct value.

The disclosed exemplary embodiments provide a user equipment, a system, a method and a computer program product for selecting an access network based on characteristics of a desired data flow. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The present exemplary embodiments may be implemented in a user equipment, a base station, and generally in a wireless communication network or system comprising both the user equipment and the base station. The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAS) circuits, any other type of integrated circuit (IC), and/or a state machine. A processor in association with software may be used to implement a radio frequency transceiver for use in the user equipment, the base station or any host computer. The user equipment may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A method for ranking a plurality of available access networks by a provider, the provider serving a user equipment and the user equipment being configured to connect to at least one of the plurality of available access networks, the method comprising:

receiving a selection request at a selection entity of the provider, wherein the selection request includes a vector parameter P that includes required characteristics of a data flow for the user equipment;

sending from the selection entity a capability request, including the vector parameter P, to the plurality of available access networks;

receiving at the selection entity a capability response from the plurality of available access networks, wherein each capability response includes a normalized value generated by a selection function S(Q) expressing as a percentage a capability of a corresponding available access network to provide the required characteristics of the data flow and wherein the normalized value is calculated based on information available only within the corresponding access network according to $$S(Q) = \frac{\sum_{i=1}^{m} w_i f_i}{m}$$

wherein
Q is a data flow vector including the vector parameter P and defining the data flow;
i is an index of a parameter of the input vector Q;
m is a total number of parameters of the input vector Q;
$w_i$ is a weight corresponding to parameter i;
$f_i$ is a function calculated for parameter i; and
generating a ranking list of the available access networks based on the received normalized values.

2. The method of claim 1, wherein the vector parameter P is associated with a quality of service (QoS) of the data flow and includes at least one of a delay, jitter, and packet loss associated with the data flow.

3. A selection entity of a provider for ranking a plurality of available access networks, the provider serving a user equipment and the user equipment being configured to connect to at least one of the plurality of available access networks, the selection entity comprising:
a network discovery module for detecting the plurality of available access networks; and
a network selection module connected to the network discovery module and for,
receiving a selection request, wherein the selection request includes a vector parameter P that includes required characteristics of a data flow for the user equipment,
sending from the selection entity a capability request, including the vector parameter, to the plurality of available access networks,
receiving a capability response from the plurality of available access networks, wherein each capability response includes a normalized value generated by a selection function S(Q) expressing as a percentage a capability of a corresponding available access network to provide the required characteristics of the data flow and wherein the normalized value is calculated based on information available only within the corresponding access network according to $$S(Q) = \frac{\sum_{i=1}^{m} w_i f_i}{m}$$

wherein
Q is a data flow vector including the vector parameter P and defining the data flow;
i is an index of a parameter of the input vector Q;
m is a total number of parameters of the input vector Q;
$w_i$ is a weight corresponding to parameter i;
$f_i$ is a function calculated for parameter i; and
generating a ranking list of the available access networks based on the received normalized values.

4. The selection entity of claim 3, wherein the vector parameter P is associated with a quality of service (QoS) of the data flow and includes at least one of a delay, jitter, and packet loss associated with the data flow.

5. A method for determining a capability of an access network to meet required characteristics of a data flow for a user equipment, wherein the user equipment or a provider selects one of a plurality of available access networks based on a ranking of the plurality of available access networks, the method comprising:
receiving at an admission control module of the access network a capability request, the capability request including a vector parameter P that includes the required characteristics of the data flow;
authorizing the capability request in a policy module of the access network based on local policies stored in the access network;
generating in the admission control module a data flow vector Q defining the data flow, wherein the data flow vector Q includes the vector parameter P;
applying in the admission control module a selection function S(Q) on the data flow vector Q to generate a normalized value expressing as percentage the capability of the access network to provide the required characteristics of the data flow and wherein the normalized value is calculated based on information available only within the corresponding access network according to $$S(Q) = \frac{\sum_{i=1}^{m} w_i f_i}{m}$$

wherein
Q is a data flow vector including the vector parameter P and defining the data flow;
i is an index of a parameter of the input vector Q;
m is a total number of parameters of the input vector Q;
$w_i$ is a weight corresponding to parameter i;
$f_i$ is a function calculated for parameter i; and
sending the normalized value from the access network to the user equipment or the provider.

6. The method of claim 5, wherein the vector parameter P is associated with a quality of service (QoS) of the data flow and includes at least one of a delay, jitter, and packet loss associated with the data flow.

7. The method of claim 5, wherein the data flow vector Q includes a cost of transmission per unit of bandwidth parameter.

8. The method of claim 5, wherein the selection function S is configured to have as input a plurality of parameters and as output only the normalized value.

9. The method of claim 5, further comprising:
receiving the selection function S(Q) from the provider or from the user equipment.

10. An access network for determining a capability to meet required characteristics of a data flow for a user equipment, wherein the user equipment or a provider selects one of a plurality of available access networks based on a ranking of the plurality of available access networks, the access network comprising:
an admission control module for receiving a capability request, the capability request including a vector parameter P that includes the required characteristics of the data flow;
a policy module connected to the admission control module, the admission control module authorizing the capability request based on local policies stored in the access network;

the admission control module generating a data flow vector Q defining the data flow, wherein the data flow vector Q includes the vector parameter P, and applying a selection function S(Q) on the data flow vector Q to generate a normalized value expressing as a percentage the capability of the access network to provide the required characteristics of the data flow and wherein the normalized value is calculated based on information available only within the corresponding access network according to $$S(Q) = \frac{\sum_{i=1}^{m} w_i f_i}{m}$$

wherein
- Q is a data flow vector including the vector parameter P and defining the data flow
- i is an index of a parameter of the input vector Q;
- m is a total number of parameters of the input vector Q;
- $w_i$ is a weight corresponding to parameter i;
- $f_i$ is a function calculated for parameter i; and
- a communication module for sending the normalized value from the access network to the provider or the user equipment.

11. The access network of claim 10, wherein the vector parameter P is associated with a quality of service (QoS) of the data flow and includes at least one of a delay, jitter, and packet loss associated with the data flow.

12. The access network of claim 10, wherein the data flow vector Q includes a cost of transmission per unit of bandwidth parameter.

13. The access network of claim 10, wherein the selection function S is configured to have as input a plurality of parameters and as output only the normalized value.

14. The access network of claim 10, further comprising:
receiving the selection function S(Q) from the provider or from the user equipment.

15. The method of claim 1, wherein $$\sum_{i=1}^{m} w_i = 1.$$

16. The method of claim 1, wherein $$f_i = \begin{cases} 0 & \text{if } R_i \leq L_i \\ \frac{R_i - L_i}{U_i - L_i} & \text{if } L_i \leq R_i \leq U_i \\ 1 & \text{if } R_i \geq U_i \end{cases}$$

and wherein
- $R_i$ is a real value of a QoS parameter i;
- $L_i$ is a lower bound for the QoS parameter i; and
- $U_i$ is an upper bound for the QoS parameter i.

17. The selection entity of claim 3, wherein $$\sum_{i=1}^{m} w_i = 1.$$

18. The selection entity of claim 3, wherein $$f_i = \begin{cases} 0 & \text{if } R_i \leq L_i \\ \frac{R_i - L_i}{U_i - L_i} & \text{if } L_i \leq R_i \leq U_i \\ 1 & \text{if } R_i \geq U_i \end{cases}$$

and wherein
- $R_i$ is a real value of a QoS parameter i;
- $L_i$ is a lower bound for the QoS parameter i; and
- $U_i$ is an upper bound for the QoS parameter i.

19. The method of claim 5, wherein $$\sum_{i=1}^{m} w_i = 1.$$

20. The method of claim 5, wherein $$f_i = \begin{cases} 0 & \text{if } R_i \leq L_i \\ \frac{R_i - L_i}{U_i - L_i} & \text{if } L_i \leq R_i \leq U_i \\ 1 & \text{if } R_i \geq U_i \end{cases}$$

and wherein
- $R_i$ is a real value of a QoS parameter i;
- $L_i$ is a lower bound for the QoS parameter i; and
- $U_i$ is an upper bound for the QoS parameter i.

21. The access network of claim 10, wherein $$\sum_{i=1}^{m} w_i = 1.$$

22. The access network of claim 10, wherein $$f_i = \begin{cases} 0 & \text{if } R_i \leq L_i \\ \frac{R_i - L_i}{U_i - L_i} & \text{if } L_i \leq R_i \leq U_i \\ 1 & \text{if } R_i \geq U_i \end{cases}$$

and wherein
- $R_i$ is a real value of a QoS parameter i;
- $L_i$ is a lower bound for the QoS parameter i; and
- $U_i$ is an upper bound for the QoS parameter i.

* * * * *

UNITED STATES PATENT AND TRADEMARK OFFICE
CERTIFICATE OF CORRECTION

| | | |
|---|---|---|
| PATENT NO. | : 7,957,350 B2 | |
| APPLICATION NO. | : 12/175623 | |
| DATED | : June 7, 2011 | |
| INVENTOR(S) | : Oulai et al. | |

It is certified that error appears in the above-identified patent and that said Letters Patent is hereby corrected as shown below:

In Column 10, Line 23, delete "(FPGAS)" and insert -- (FPGAs) --, therefor.

In Column 12, Line 20, in Claim 5, delete "as" and insert -- as a --, therefor.

Signed and Sealed this
Twentieth Day of March, 2012

David J. Kappos
*Director of the United States Patent and Trademark Office*